US010020528B2

(12) United States Patent
Ohmori et al.

(10) Patent No.: US 10,020,528 B2
(45) Date of Patent: Jul. 10, 2018

(54) FUEL CELL

(71) Applicant: NGK INSULATORS, LTD., Nagoya-shi, Aichi (JP)

(72) Inventors: Makoto Ohmori, Nagoya (JP); Shinji Fujisaki, Kuwana (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 15/347,163

(22) Filed: Nov. 9, 2016

(65) Prior Publication Data

US 2017/0062856 A1    Mar. 2, 2017

Related U.S. Application Data

(63) Continuation of application No. PCT/JP2016/069943, filed on Jul. 5, 2016.

(30) Foreign Application Priority Data

Jul. 7, 2015    (JP) .................................. 2015-135970

(51) Int. Cl.

| H01M 8/1253 | (2016.01) |
| H01M 4/90 | (2006.01) |
| H01M 8/2425 | (2016.01) |
| H01M 8/0223 | (2016.01) |

(Continued)

(52) U.S. Cl.

CPC ......... H01M 8/1253 (2013.01); C04B 35/486 (2013.01); H01M 4/9025 (2013.01);

(Continued)

(58) Field of Classification Search

CPC ............. H01M 8/1253; H01M 8/2432; H01M 8/0247; H01M 8/0223; H01M 4/9025;

(Continued)

(56) References Cited

U.S. PATENT DOCUMENTS 5,169,513 A * 12/1992 Mase ...................... B32B 18/00
                                                                 204/412
7,820,332 B2 * 10/2010 Badding ............. H01M 8/1253
                                                                 429/400

(Continued)

FOREIGN PATENT DOCUMENTS

| JP | 2005-187241 A | 7/2005 |
| JP | 2008-135272 A | 6/2008 |

(Continued)

OTHER PUBLICATIONS

International Search Report dated Aug. 23, 2016 for the corresponding International Application No. PCT/JP2016/069943.

(Continued)

*Primary Examiner* — Lisa S Park

(74) *Attorney, Agent, or Firm* — Global IP Counselors, LLP

(57) ABSTRACT

A fuel cell comprises an anode, a cathode, and a solid electrolyte layer disposed between the anode and the cathode. The solid electrolyte layer contains a zirconia-based material as a main component. A first intensity ratio of tetragonal crystal zirconia to cubic crystal zirconia in a Raman spectrum in a central portion of the solid electrolyte layer is greater than a second intensity ratio of tetragonal crystal zirconia to cubic crystal zirconia in a Raman spectrum of an outer edge.

8 Claims, 4 Drawing Sheets

(51) Int. Cl.
*H01M 8/0247* (2016.01)
*H01M 8/2432* (2016.01)
*C04B 35/486* (2006.01)
*H01M 8/124* (2016.01)
*H01M 4/88* (2006.01)

(52) U.S. Cl.
CPC ....... *H01M 4/9033* (2013.01); *H01M 8/0223* (2013.01); *H01M 8/0247* (2013.01); *H01M 8/2425* (2013.01); *H01M 8/2432* (2016.02); *C04B 2235/3225* (2013.01); *C04B 2235/3246* (2013.01); *C04B 2235/75* (2013.01); *C04B 2235/762* (2013.01); *C04B 2235/765* (2013.01); *H01M 4/8889* (2013.01); *H01M 2008/1293* (2013.01); *H01M 2300/0077* (2013.01); *H01M 2300/0088* (2013.01); *Y02E 60/525* (2013.01); *Y02P 70/56* (2015.11)

(58) Field of Classification Search
CPC ............. H01M 8/2425; H01M 4/9033; H01M 2300/0077; H01M 2300/0088; H01M 4/8889; H01M 2008/1293
See application file for complete search history.

(56) References Cited

U.S. PATENT DOCUMENTS

2004/0081878 A1* 4/2004 Mardilovich ....... H01M 8/0247
429/456
2013/0309582 A1 11/2013 Shimazu et al.

FOREIGN PATENT DOCUMENTS

| JP | 2014-191944 A | 10/2014 |
| JP | 2014-216237 A | 11/2014 |
| JP | 2015-118925 A | 6/2015 |
| WO | 2012/105580 A1 | 8/2012 |

OTHER PUBLICATIONS

Translation of International Search Report dated Aug. 23, 2016 for the corresponding International Application No. PCT/JP2016/069943.

* cited by examiner

FUEL CELL

TECHNICAL FIELD

The present invention relates to a fuel cell.

BACKGROUND ART

A fuel cell stack is known to be typically configured by alternate stacking of a tabular fuel cell and a metal current collecting member (For example, reference is made to Japanese Patent Application Laid-Open No. 2008-135272).

The fuel cell includes an anode, a cathode and a solid electrolyte layer between the anode and the cathode.

SUMMARY OF INVENTION

However, since each member that configures the fuel cell has a different coefficient of thermal expansion, damage may result to the solid electrolyte layer during firing or operation of the fuel cell as a result of stress concentration.

The present invention is proposed in light of the above circumstances, and has the object of providing a fuel cell that can suppress damage to the solid electrolyte layer.

The fuel cell according to the present invention comprises an anode, a cathode, and a solid electrolyte layer disposed between the anode and the cathode. The solid electrolyte layer contains a zirconia-based material as a main component. A first intensity ratio of tetragonal crystal zirconia to cubic crystal zirconia in a Raman spectrum at a center of the solid electrolyte layer is greater than a second intensity ratio of tetragonal crystal zirconia to cubic crystal zirconia in a Raman spectrum at an outer edge.

Advantageous Effects of Invention

The present invention provides a fuel cell that can suppress damage to the solid electrolyte layer.

DESCRIPTION OF EMBODIMENTS

Figure 1:
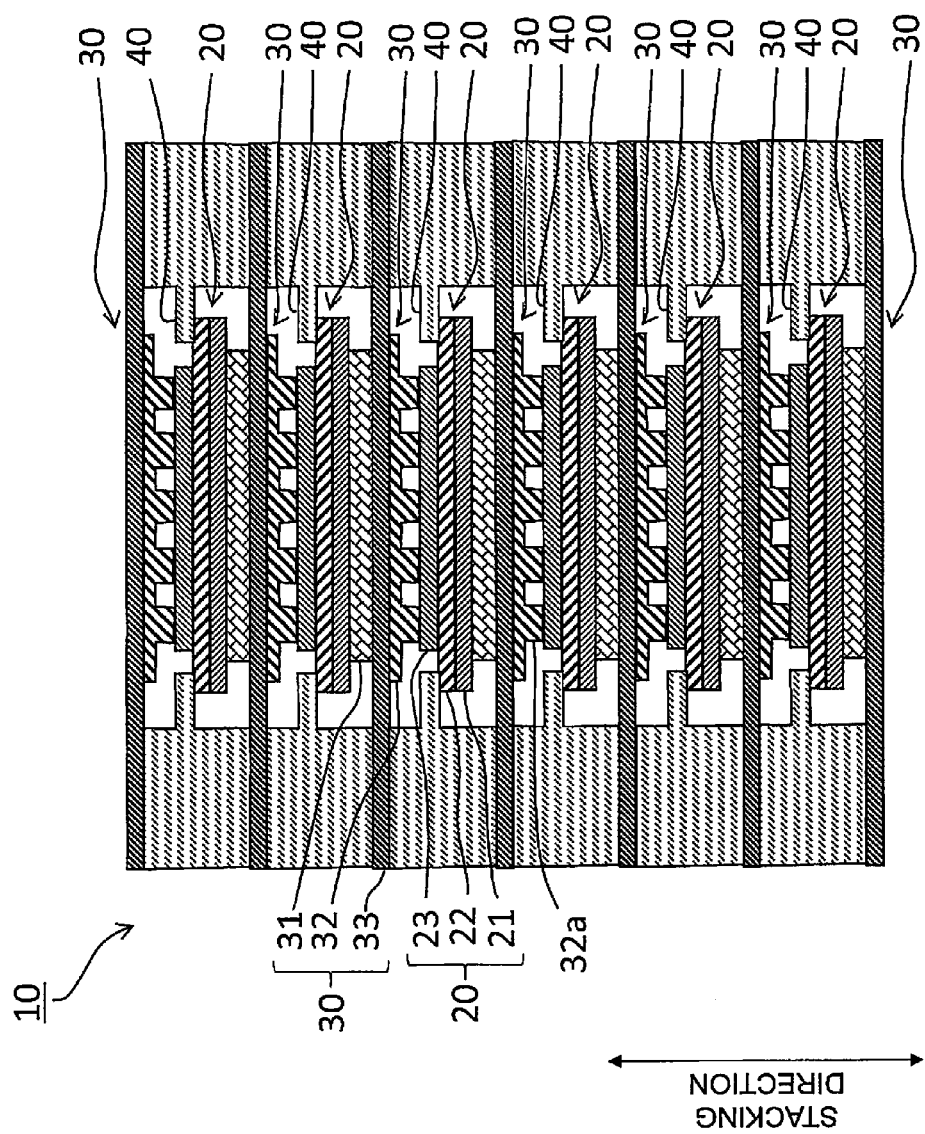
FIG. 1 is a cross sectional view that schematically illustrates a configuration of a fuel cell stack.

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective figures.

Configuration of Fuel Cell Stack 10

A configuration of a fuel cell stack 10 will be described making reference to the figures. FIG. 1 is a cross sectional view that schematically illustrates a configuration of a fuel cell stack 10.

The fuel cell stack 10 comprises six fuel cells 20, seven current collecting members 30 and six separators 40.

The six fuel cells 20 and seven current collecting members 30 are stacked alternately with reference to a stacking direction. Each separator 40 is disposed to enclose each fuel cell 20. The fuel cell stack 10 is fastened by a bolt that passes in the stacking direction through the six separators 40 and seven separators 33 described below.

The six fuel cells 20 are configured as a so-called solid oxide fuel cell (SOFC). The six fuel cells 20 respectively have a tabular configuration.

Configuration of Fuel Cell 20

The fuel cell 20 includes an anode 21, a solid electrolyte layer 22 and a cathode 23. The anode 21, the solid electrolyte layer 22 and the cathode 23 are stacked in order with reference to the stacking direction.

The anode 21 functions as the anode for the fuel cell 20. The anode 21 is a porous body that exhibits superior fuel gas permeability. The thickness of the anode 21 may be configured as 0.2 mm to 5.0 mm. The anode 21 may be for example configured by NiO(nickel oxide)-8YSZ (8 mol % of yttria-stabilized zirconia). When NiO is included in the anode 21, at least a portion of the NiO may be reduced to Ni during operation of the fuel cell 20.

The solid electrolyte layer 22 is fixed to the separator 40. The solid electrolyte layer 22 is disposed between the anode 21 and the cathode 23. The thickness of the solid electrolyte layer 22 may be configured as 3 micrometers to 30 micrometers. The solid electrolyte layer 22 contains a zirconia-based material as a main component. The zirconia-based material includes cubic crystal zirconia and tetragonal crystal zirconia.

In the present embodiment, the term such that composition X "contains as a main component" composition Y means that composition Y occupies greater than or equal to 70 wt % of the total of composition X.

Cubic crystal zirconia is zirconia in which the crystal phase is mainly cubic crystals. Cubic crystal zirconia for example includes for example 8YSZ, 10YSZ (10 mol % yttria stabilized zirconia).

Tetragonal crystal zirconia is zirconia in which the crystal phase is mainly tetragonal crystals. Tetragonal crystal zirconia includes for example zirconia stabilized with less than or equal to 3 mol % of yttria such as 2.5YSZ (2.5 mol % yttria stabilized zirconia) or 3YSZ (3 mol % yttria stabilized zirconia). The conductance of the tetragonal crystal zirconia is less than the conductance of the cubic crystal zirconia.

There is a risk that stress is produced on the interface between the anode 21 and the solid electrolyte layer 22 during firing or operation of the fuel cell 20 as a result of a difference in the coefficient of thermal expansion of each member that configures the fuel cell 20, or due to dimensional changes in the anode caused by reduction of NiO contained in the anode to Ni. In this context, tetragonal crystal zirconia in the present embodiment is actively introduced into sites that exhibit a tendency to produce stress on the solid electrolyte layer 22 to thereby inhibit damage to the solid electrolyte layer 22. The distribution of tetragonal crystal zirconia in the solid electrolyte layer 22 will be described below with reference to Distribution Example 1 and Distribution Example 2.

The cathode 23 is disposed on the solid electrolyte layer 22. The cathode 23 functions as a cathode for the fuel cell 20. The cathode 23 is a porous body that exhibits superior oxidant gas permeation. The thickness of the cathode 22 may be configured to 5 micrometers to 50 micrometers.

The main component of the cathode 23 is a perovskite composite oxide including at least one of La or Sr at the A site and that is expressed by the general formula $ABO_3$. This type of perovskite composite oxide includes LSCF ((La, Sr)(Co, Fe)$O_3$: lanthanum strontium cobalt ferrite), LSF: ((La, Sr) Fe$O_3$: lanthanum strontium ferrite), LSC: ((La, Sr)Co$O_3$: lanthanum strontium cobaltite), LNF ((La(Ni, Fe)$O_3$: lanthanum nickel ferrite), LSM ((La, Sr) Mn$O_3$: lanthanum strontium manganate), or the like. However there is no limitation in this regard.

Configuration of Current Collecting Member 30

The current collecting member 30 electrically connects fuel cells 20, and isolates fuel gas and oxidant gas. The current collecting member 30 includes an anode current collecting member 31, a cathode current collecting member 32 and a separator 33.

The anode current collecting member 31 is disposed between the anode 21 and the separator 33. The anode current collecting member 31 electrically connects the anode 21 and the separator 33. The anode current collecting member 31 may mechanically connect the anode 21 and the separator 33 through a conductive bonding agent. The anode current collecting member 31 is configured from a material that exhibits conductivity. The anode current collecting member 31 is configured with a shape that enables supply of fuel gas to the anode 21. A nickel mesh member for example may be used as the anode current collecting member 31.

The cathode current collecting member 32 is disposed opposite to the anode current collecting member 31 with the separator 33 interposed therebetween. The cathode current collecting member 32 is disposed between the cathode 23 and the separator 33. The cathode current collecting member 32 electrically connects the cathode 23 and the separator 33. The cathode current collecting member 32 includes a plurality of connection portions 32a that are electrically connected with the cathode 23. The plurality of connection portions 32a is disposed in a matrix configuration. Each connection portion 32a projects towards the side of the cathode 23. The connection portions 32a may be mechanically connected with the cathode 23 through a conductive bonding agent. The cathode current collecting member 32 is configured from a material that exhibits conductivity. The cathode current collecting member 32 is configured with a shape that enables supply of oxidant gas to the cathode 23. A stainless steel (SUS430 or the like) tabular member that contains chromium and iron for example may be used as the cathode current collecting member 32.

The separator 33 is disposed between the anode current collecting member 31 and the cathode current collecting member 32. The separator 33 is configured from a material that exhibits conductivity. A stainless steel tabular member that contains chromium and iron for example may be used as the separator 33. A cavity is formed for the supply of fuel gas between the separator 33 and the anode 21. A cavity is formed for the supply of oxidant gas between the separator 33 and the cathode 23.

Distribution Example 1 of Tetragonal Crystal Zirconia in Solid Electrolyte Layer 22

Figure 2:
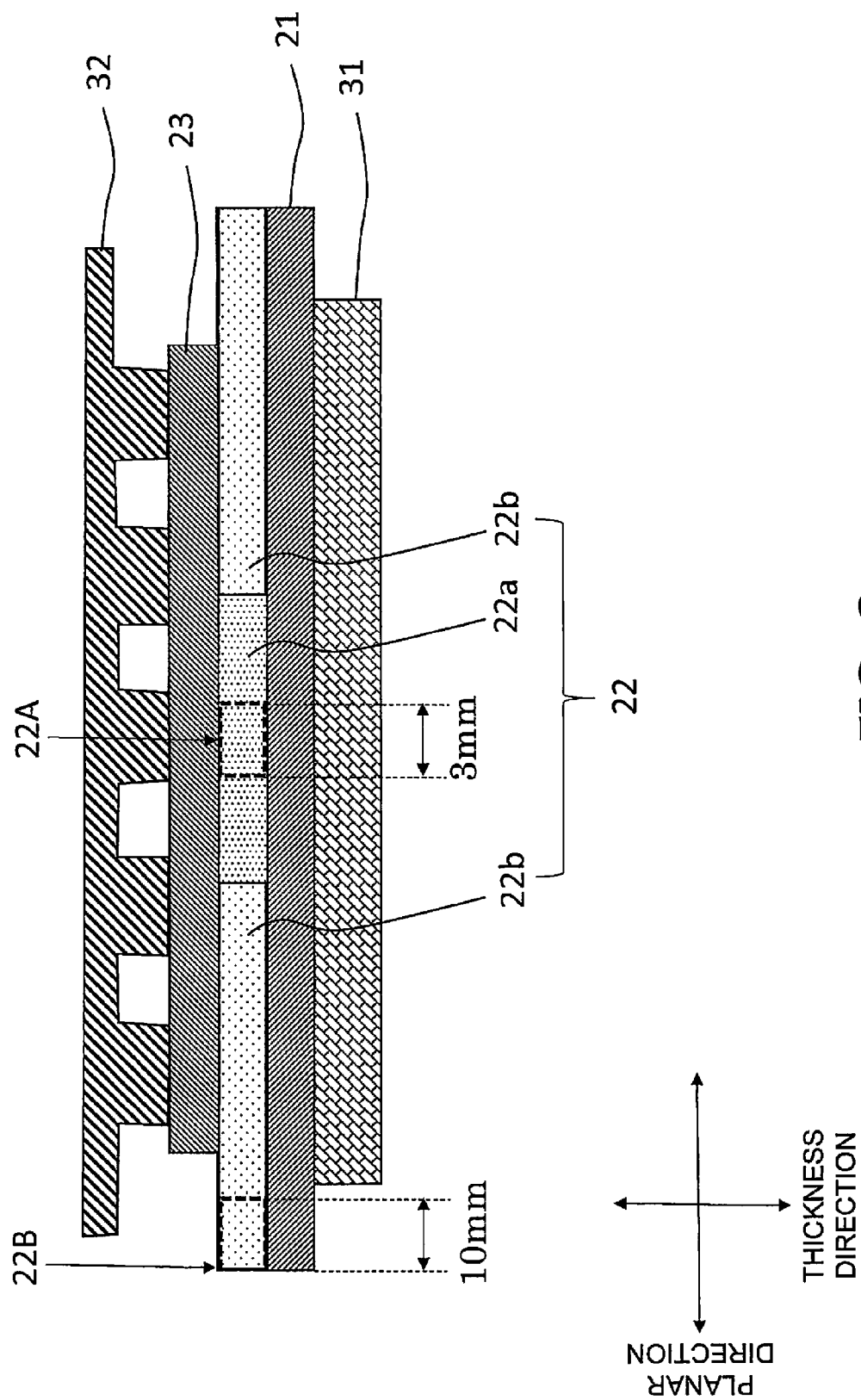
FIG. 2 is a partial enlarged view of FIG. 1.
Figure 3:
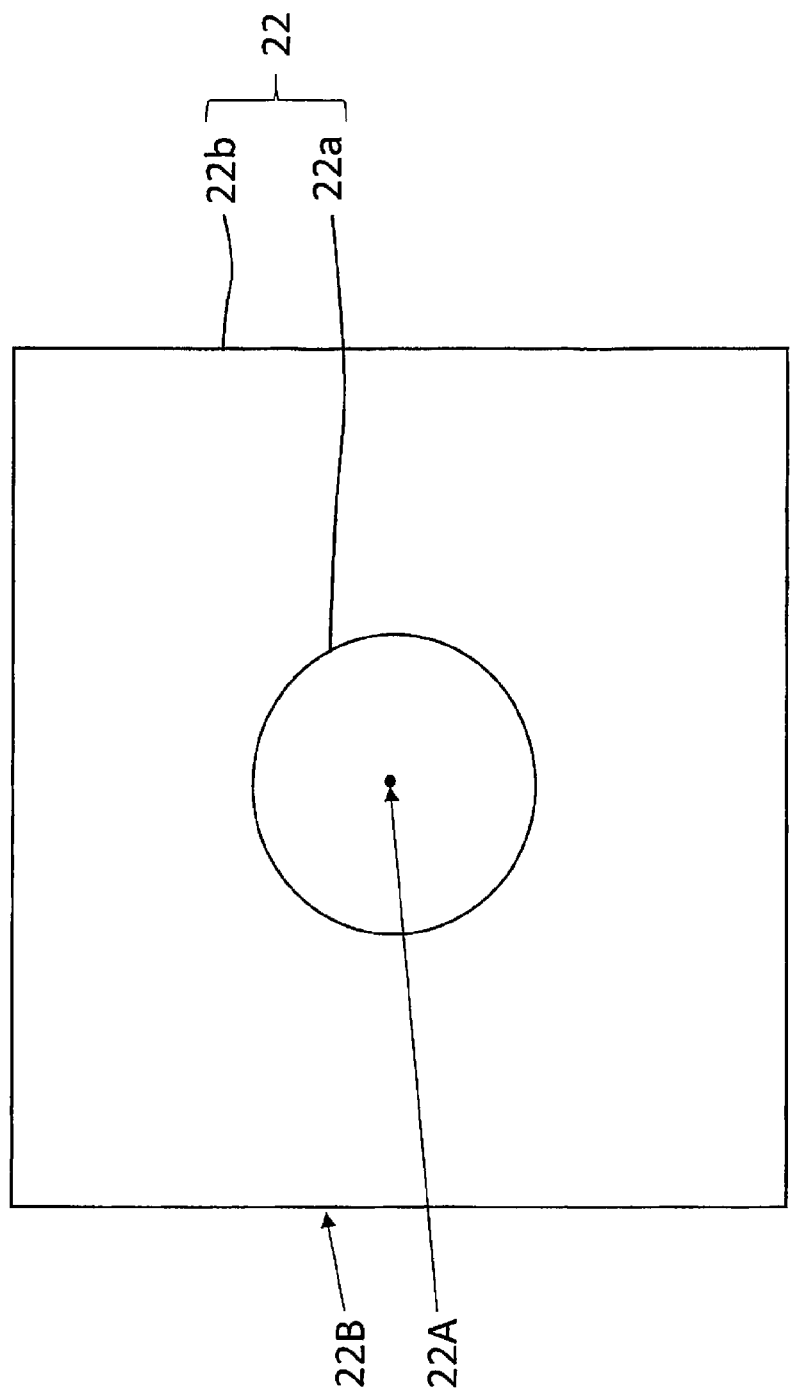
FIG. 3 is a plan view of a solid electrolyte layer of a first fuel cell.

Next, a preferred Distribution Example 1 for tetragonal crystal zirconia in the solid electrolyte layer 22 of the fuel cell 20 will be described making reference to the figures. FIG. 2 is a partial enlarged view of FIG. 1. FIG. 3 is a plan view of the solid electrolyte layer 22 of the fuel cell 20.

The solid electrolyte layer 22 in Distribution Example 1 includes a central portion 22a and an outer peripheral portion 22b. The central portion 22a and the outer peripheral portion 22b are integrally formed.

The central portion 22a is positioned in the center of the solid electrolyte layer 22 with reference to a plane direction that is perpendicular to the thickness direction (the same as the stacking direction). In Distribution Example 1, the planar shape of the central portion 22a is circular, but may have an oval, rectangular, polygonal or irregular shape. There is no particular limitation in relation to the planar size of the central portion 22a, and it may be configured as greater than or equal to 5% and less than or equal to 50% of the total surface area of the solid electrolyte layer 22, with greater than or equal to 10% and less than or equal to 30% being preferred.

The outer peripheral portion 22b encloses the outer periphery of the central portion 22a. The outer peripheral portion 22b is a portion of the solid electrolyte layer 22 other than the central portion 22a. The planar shape or planar size of the outer peripheral portion 22b may be suitably configured in response to the planar shape or planar size of the central portion 22a.

The central portion 22a contains cubic crystal zirconia as a main component, and contains tetragonal crystal zirconia as a secondary component.

The outer peripheral portion 22b contains cubic crystal zirconia as a main component. Although the outer peripheral portion 22b may contain tetragonal crystal zirconia as a secondary component, the tetragonal crystal zirconia may be omitted.

In the present embodiment, an intensity ratio (referred to below as "first intensity ratio") R1 of tetragonal crystal zirconia to cubic crystal zirconia in a Raman spectrum at the center 22A of the solid electrolyte layer 22 is greater than an intensity ratio (referred to below as "second intensity ratio") R2 of tetragonal crystal zirconia to cubic crystal zirconia in a Raman spectrum of an outer peripheral portion 22B of the solid electrolyte layer 22. Consequently, in proximity to the center 22A, cubic crystal zirconia particles can be strongly connected by tetragonal zirconia particles that have a small particle diameter when compared to cubic crystal zirconia. In this manner, strengthening of the backbone structure in proximity to the center 22A inhibits damage resulting from stress concentration in proximity to the center 22A even when warping is produced in the fuel cell 20 as a result of a difference in the coefficient of thermal expansion in each member contained in the fuel cell 20.

In the present embodiment, the center 22A of the solid electrolyte layer 22 is the geometric center when viewed in plan. The first intensity ratio R1 at the center 22A of the solid electrolyte layer 22 is obtained as described below.

Firstly a Raman spectrum is acquired at five positions within a range of 3 mm from the center 22A in a planar direction that is perpendicular to the thickness direction in a cross section that is parallel to the direction of thickness (same as the stacking direction) of the solid electrolyte layer 22. The five positions for acquisition of the Raman spectrum are set at positions that equally divide the thickness direction of the solid electrolyte layer 22. A Raman spectrum may be obtained by use of a micro-laser Raman spectroscopic device manufactured by Horiba Ltd (model: LabRAM ARAMIS).

Next, a ratio of the spectral intensity of the tetragonal crystal zirconia to the spectral intensity of the cubic crystal zirconia is calculated by analyzing the Raman spectra for the respective five positions by use of the respectively unique Raman spectra (known spectral data) for tetragonal crystal zirconia and cubic crystal zirconia. A CLS method that is a known method for inferring a chemical type based on a plurality of Raman spectra is used as the method of analyzing the Raman spectrum based on known spectral data.

Next, the first intensity ratio R1 at the center 22A of the solid electrolyte layer 22 is calculated from the arithmetic average of the intensity ratios calculated respectively for the Raman spectra for the five positions. The first intensity ratio R1 is an indicator that shows the tetragonal crystal zirconia concentration ratio (abundance ratio) relative to cubic crystal zirconia at the center 22A of the solid electrolyte layer 22.

Although there is no particular limitation on the value of the first intensity ratio R1 at the center 22A of the solid electrolyte layer 22, it may be configured as greater than or equal to 0.1 and less than or equal to 1.5. The value of the first intensity ratio R1 is preferably greater than or equal to 0.2 and less than or equal to 1.2.

In the Raman spectrum that is acquired at the five positions in the thickness direction, the spectral intensity ratio of tetragonal crystal zirconia preferably takes a maximum value in the Raman spectrum detected at a position within 3 micrometers from the anode 21. In this manner, since the backbone structure particularly on the side near the cathode 21 of the center 22A of the solid electrolyte layer 22 can be strengthened, it is possible to further inhibit damage in proximity to the interface with the anode 21 that exhibits a tendency to expand or contract as a result of oxidation and reduction reactions.

An outer periphery 22B of the solid electrolyte layer 22 in the present embodiment is the outer edge when viewed in plan. The second intensity ratio R2 on the outer edge 22B of the solid electrolyte layer 22 is obtained as described below.

Firstly a Raman spectrum is acquired at five positions within a range of 10 mm from the outer edge 22B in a planar direction with reference to a cross section that is parallel to the thickness direction of the solid electrolyte layer 22. The five positions for acquisition of the Raman spectrum are set at positions that equally divide the thickness direction of the solid electrolyte layer 22. A Raman spectrum may be obtained by use of a micro-laser Raman spectroscopic device manufactured by Horiba Ltd (model: LabRAM ARAMIS).

Next, a ratio of the spectral intensity of the tetragonal crystal zirconia to the spectral intensity of the cubic crystal zirconia is calculated by analyzing the Raman spectra for the respective five positions by use of a CLS method.

Next, the second intensity ratio R2 at the outer edge 22B of the solid electrolyte layer 22 is calculated from the arithmetic average of the intensity ratios calculated respectively for the Raman spectra at the five positions. Although there is no particular limitation on the value of the second intensity ratio R2, it may be configured as greater than or equal to 0 and less than or equal to 0.5. The value of the second intensity ratio R2 is preferably greater than or equal to 0 and less than or equal to 0.4.

Distribution Example 2 of Tetragonal Crystal Zirconia in Solid Electrolyte Layer 22

Figure 4:
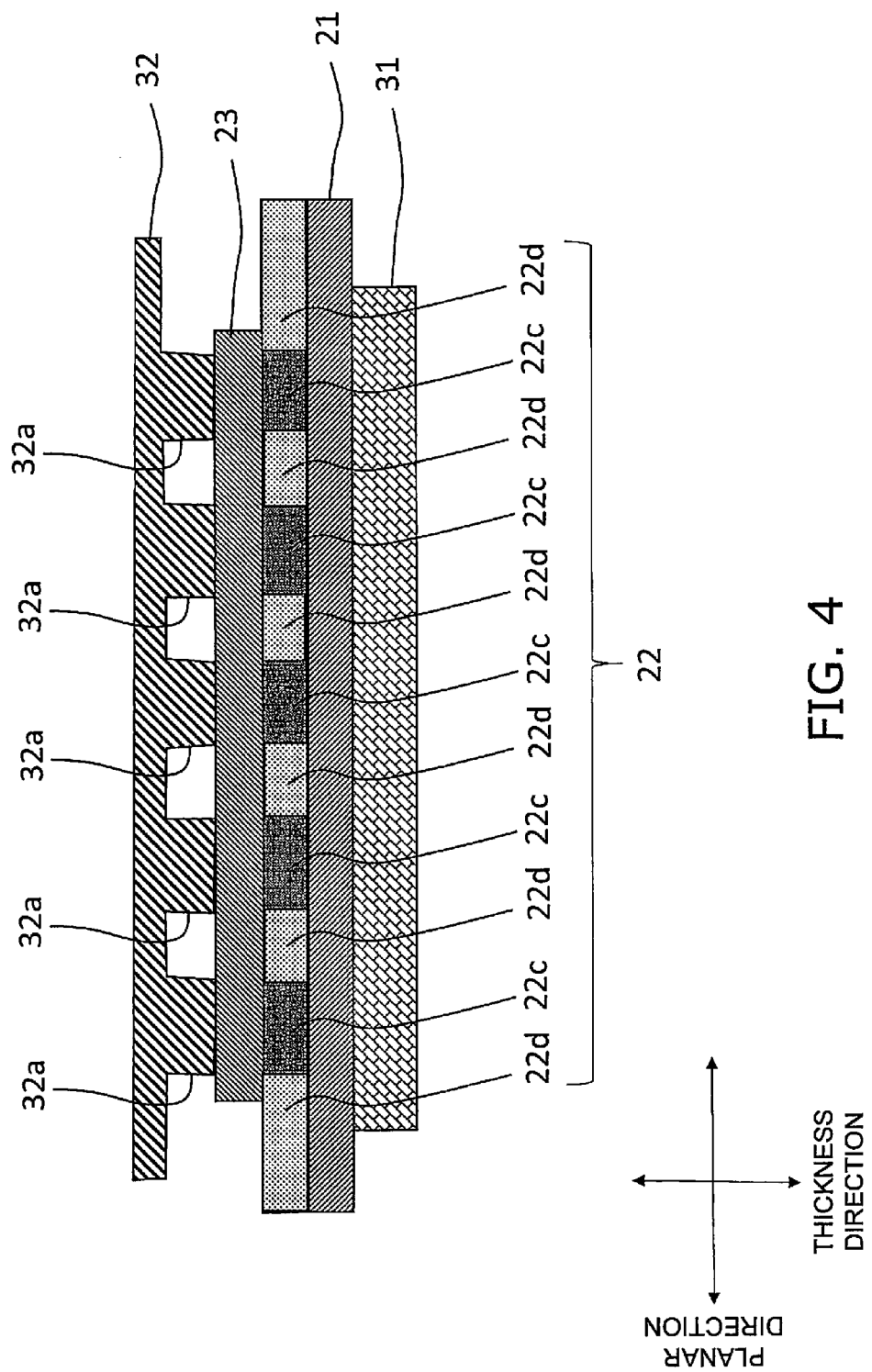
FIG. 4 is a partial enlarged view of FIG. 1.

Next, a preferred Distribution Example 2 for tetragonal crystal zirconia in the solid electrolyte layer 22 of the fuel cell 20 will be described making reference to the figures. FIG. 4 is a partial enlarged view of FIG. 1.

The solid electrolyte layer 22 in Distribution Example 2 includes an overlapping portion 22c and a non-overlapping portion 22d.

The overlapping portion 22c overlaps with the connection portions 32a of the cathode current collecting member 32 in the thickness direction. FIG. 4 illustrates five connection portions 32a, and therefore five corresponding overlapping portions 22c are provided in the solid electrolyte layer 22. However the number of overlapping portions 22c may be suitably set in response to the number of connection portions 32a. The planar shape or planar size of the overlapping portions 22c may be suitably configured in response to the planar shape or planar size of the connection portions 32a.

The non-overlapping portion 22d does not overlap with the connection portions 32a in the thickness direction. The position of the non-overlapping portion 22d deviates from the position of the connection portions 32a in the planar direction. The non-overlapping portion 22d in the solid electrolyte layer 22 is a portion other than the overlapping portion 22c. The non-overlapping portion 22d is integrally formed with the overlapping portion 22c. The planar shape or planar size of the non-overlapping portion 22d may be suitably configured in response to the planar shape or planar size of the overlapping portion 22c.

The overlapping portion 22c contains cubic crystal zirconia as a main component, and contains tetragonal crystal zirconia as a secondary component.

The non-overlapping portion 22d contains cubic crystal zirconia as a main component. Although the non-overlapping portion 22d may contain tetragonal crystal zirconia as a secondary component, the tetragonal crystal zirconia may be omitted.

In the present embodiment, an intensity ratio (referred to below as "third intensity ratio") R3 of tetragonal crystal zirconia to cubic crystal zirconia in a Raman spectrum in the overlapping portion 22c is greater than an intensity ratio (referred to below as "fourth intensity ratio") R4 of tetragonal crystal zirconia to cubic crystal zirconia in a Raman spectrum of the non-overlapping portion 22d. Consequently, in the overlapping portion 22c, cubic crystal zirconia particles can be strongly connected by tetragonal zirconia particles that have a small particle diameter when compared to cubic crystal zirconia. In this manner, strengthening of the backbone structure of the overlapping portion 22c inhibits damage resulting from stress concentration in the overlapping portion 22c even when the overlapping portion 22c reaches a high temperature by reason of proximity to the connection portion 32a.

The third intensity ratio R3 in the overlapping portion 22c in the present embodiment is obtained as described below.

Firstly a Raman spectrum is acquired at five positions within the overlapping portion 22c in a cross section that is parallel to the direction of thickness of the solid electrolyte layer 22. The five positions for acquisition of the Raman spectrum are set at positions that equally divide the thickness direction of the overlapping portion 22c. A Raman spectrum may be obtained by use of a micro-laser Raman spectroscopic device manufactured by Horiba Ltd (model: LabRAM ARAMIS).

Next, a ratio of the spectral intensity of the tetragonal crystal zirconia to the spectral intensity of the cubic crystal zirconia is calculated by analyzing the Raman spectra for the respective five positions by use of a CLS method.

Next, the third intensity ratio R3 in the overlapping portion 22c is calculated from the arithmetic average of the intensity ratios calculated respectively for the Raman spectra for the five positions. Although there is no particular limitation on the value of the third intensity ratio R3, it may be configured as greater than or equal to 0.1 and less than or equal to 1.6. The value of the third intensity ratio R3 is preferably greater than or equal to 0.2 and less than or equal to 1.2.

In the Raman spectrum that is acquired at the five positions in the thickness direction, the spectral intensity ratio of tetragonal crystal zirconia preferably takes a maximum value in the Raman spectrum detected at a position within 3 micrometers from the anode 21. In this manner, since the backbone structure particularly on the side near the cathode 21 of the overlapping portion 22c can be strengthened, it is possible to further inhibit damage to the proximity of the interface with the anode 21 that exhibits a tendency to expand or contract as a result of oxidation and reduction reactions.

The fourth intensity ratio R4 in the non-overlapping portion 22d in the present embodiment is obtained as described below.

Firstly a Raman spectrum is acquired at five positions in the non-overlapping portion 22d in a cross section that is parallel to the direction of thickness of the solid electrolyte layer 22. The five positions for acquisition of the Raman spectrum are set at positions that equally divide the thickness direction of the non-overlapping portion 22d. A Raman spectrum may be obtained by use of a micro-laser Raman spectroscopic device manufactured by Horiba Ltd (model: LabRAM ARAMIS).

Next, a ratio of the spectral intensity of the tetragonal crystal zirconia to the spectral intensity of the cubic crystal zirconia is calculated by analyzing the Raman spectra for the respective five positions by use of a CLS method.

Next, the fourth intensity ratio R4 in the non-overlapping portion 22d is calculated from the arithmetic average of the intensity ratios calculated respectively for the Raman spectra for the five positions. Although there is no particular limitation on the value of the fourth intensity ratio R4, it may be configured as greater than or equal to 0 and less than or equal to 0.5. The value of the fourth intensity ratio R4 is preferably greater than or equal to 0 and less than or equal to 0.4.

Method of Manufacturing Fuel Cell Stack 10

Next, an example of a method of manufacturing a fuel cell stack 10 will be described.

Firstly, an anode slurry is prepared by mixing NiO powder, a ceramic powder, a binder (for example, PVA) and a pore forming agent (for example, PMMA) in a ball mill. A mixed powder is prepared by drying the anode slurry in a nitrogen atmosphere, and uniaxial pressing is applied to the mixed powder to form green body for a tabular anode 21.

Next, a central portion slurry or overlapping portion slurry is prepared by mixing terpineol and a binder with a tetragonal crystal zirconia powder and cubic crystal zirconia powder.

Then, the green body for the central portion 22a or overlapping portion 22c is formed by coating the central portion slurry or overlapping portion slurry using a screen printing method or the like in a predetermined pattern onto the green body for the anode 21.

Next, an outer edge portion slurry or non-overlapping portion slurry is prepared by mixing terpineol and a binder with a cubic crystal zirconia powder. At that time, although a tetragonal crystal zirconia powder may be added, an adjustment is made so that the content ratio is lower than the central portion slurry or overlapping portion slurry.

Next, the green body for the outer edge portion 22b or the non-overlapping portion 22d is formed by coating the outer edge portion slurry or the non-overlapping portion slurry using a screen printing method or the like to avoid the green body for the central portion 22a or overlapping portion 22c that are formed on the green body for the anode 21. In this manner, the green body for the solid electrolyte layer 22 is completed. At that time, when there is an intention to increase the tetragonal crystal zirconia concentration in the solid electrolyte layer 22 on the side near to the anode 21, after coating the central portion slurry or overlapping portion slurry that contains tetragonal crystal zirconia, a slurry that exhibits a lower content ratio of tetragonal crystal zirconia, or a slurry that does not contain tetragonal crystal zirconia may be coated.

Next, the green bodies for the anode 21 and the solid electrolyte layer 22 are cofired (1300 degrees C. to 1600 degrees C., 2 to 20 hours) to thereby form a co-fired body for the anode 21 and the solid electrolyte layer 22.

Next, a cathode slurry is prepared by mixing terpineol and a binder with a cathode powder. Then, the green body for the cathode 23 is formed by coating the cathode slurry using a screen printing method or the like onto the solid electrolyte layer 22.

Next, the green body for the cathode 23 is fired (1000 degrees C. to 1100 degrees C., 1 to 10 hours) to thereby form the cathode 23. The fuel cell 20 is completed in the above manner.

Next six fuel cells 20 are bonded with six separators 40.

Seven current collecting members 30 are prepared by bonding the anode current collecting member 31 and the cathode current collecting member 32 onto both principal surfaces of the seven separators 33.

Next, the seven current collecting members 30 and six fuel cells 20 bonded with the separators 40 are disposed in an alternating configuration with reference to the stacking direction. At that time, a sealing glass material may be interposed between the separator 33 and the fuel cell 20.

An integrated configuration is realized in a compressed state in the stacking direction by fixing a bolt into a through hole that passes through the separator 40 and the separator 33. The outer surface of the stacked body may be covered using a sealing glass material.

OTHER EMBODIMENTS

The present invention is not limited to the above embodiment, and various changes or modifications may be added within a scope that does not depart from the scope of the invention.

Although there is no particular disclosure in the above embodiment, the fuel cell 20 may include provision of a diffusion prevention layer provided between the solid electrolyte layer 22 and the cathode 23. The diffusion prevention layer may be configured by a composite oxide that contains Zr and one or more rare earth elements such as Ce, Gd or the like. This type of diffusion prevention layer inhibits diffusion of the constituent elements of the cathode 23 into the solid electrolyte layer 22.

In the present embodiment, the solid electrolyte layer 22 has a configuration that includes the overlapping portions 22c at all positions that overlap in the stacking direction with each connection portion 32a of the cathode current collecting member 32. However, it is sufficient if at least one overlapping portion 22c overlaps in the stacking direction with the connection portion 32a. Furthermore, although the cathode current collecting member 32 includes a connection portion 32a that is connected to the cathode 23, the anode current collecting member 31 may include a connection portion that is partially connected to the anode 21. In this configuration, an overlapping portion 22c of the solid electrolyte layer 22 may be provided at a position that overlaps with the connection portion of the anode current collecting member 31 in a stacking direction. Furthermore, the respective anode current collecting member 31 and the cathode current collecting member 32 may include a connection portion with the same pattern or a different pattern. In this configuration, an overlapping portion 22c of the solid electrolyte layer 22 may be provided at a position that overlaps in the stacking direction with at least one of the connection portions of the anode current collecting member 31 and the cathode current collecting member 32.

In the present embodiment, the current collecting member 30 is configured by the anode current collecting member 31 and the cathode current collecting member 32 and the separator 33. However, a known separator (for example as disclosed in Japanese Patent Application Laid-Open No. 2001-196077) may be used as the current collecting member.

In the above embodiment, the solid electrolyte layer 22 of the respective six fuel cells 20 includes a central portion 22a or an overlapping portion 22c. However, it is sufficient if only a portion of the six fuel cells 20 includes a central portion 22a or an overlapping portion 22c. In particular, an effective configuration is the formation of the central portion 22a or the overlapping portion 22c in the solid electrolyte layer 22 of the central two fuel cells 20 in the stacking direction that exhibit a tendency for production of stress as a result of a difference in the degree of thermal expansion with the current collecting member 30 during startup of operation of the fuel cell stack 10.

EXAMPLES

Preparation of Sample No. 1

A fuel cell stack according to Sample No. 1 is prepared as described below.

Firstly, a mixed powder is prepared by drying a slurry of a mixture of IPA and a compounding powder of a pore-forming agent (PMMA), 8YSZ powder and NiO powder in a nitrogen atmosphere.

Next, uniaxial pressing (compaction pressure 50 MPa) is applied to the mixed powder to form a plate, and a green body for the anode is prepared by further consolidation of the plate by use of a CIP (compaction pressure: 100 MPa).

Next, a slurry for the solid electrolyte layer is prepared by mixing terpineol and a binder with a cubic crystal zirconia powder. In Sample No. 1, tetragonal crystal zirconia powder is not added to the slurry for the solid electrolyte layer.

Next, a green body for the solid electrolyte layer is formed by coating the slurry for the solid electrolyte layer using a screen printing method or the like onto the green body for the anode.

Next, the green bodies for the anode and the solid electrolyte layer are cofired (1400 degrees C., 2 hours) to thereby form a co-fired body for the anode and the solid electrolyte layer. The size of the anode is height 100 mm by breadth 100 mm and a thickness of 800 micrometers. The size of the solid electrolyte layer is height 100 mm by breadth 100 mm and a thickness of 10 micrometers.

Next, a slurry for the cathode is prepared by mixing terpineol and a binder with LSCF powder. The green body for the cathode is formed by coating the cathode slurry by use of a screen printing method onto the solid electrolyte layer. Thereafter, the green body for the cathode is fired (1100 degrees C., 1 hour) to form the cathode. The size of the cathode is height 90 mm by breadth 90 mm and a thickness of 50 micrometers.

Six fuel cells made in the above manner are prepared, and a stainless steel separator is bonded to the six respective fuel cells.

A stainless steel member that includes a nickel mesh and a plurality of protrusions (connection portions with the cathode) is bonded to both principal surfaces respectively of the seven stainless steel plates to thereby prepare seven current collecting members.

Next, the seven current collecting members and the six fuel cells bonded to stainless steel separators are alternately stacked with reference to a stacking direction.

An integrated configuration is realized in a compressed state in the stacking direction by fixing a bolt into a through hole that passes through the separator and the separator.

Preparation of Samples No. 2 to No. 7

A fuel cell stack according to Samples No. 2 to No. 7 is prepared as described below.

Firstly, a mixed powder is prepared by drying a slurry of a mixture of IPA and a compounding powder of a pore-forming agent (PMMA), 8YSZ powder and NiO powder in a nitrogen atmosphere.

Next, uniaxial pressing (compaction pressure 50 MPa) is applied to the mixed powder to form a plate, and a green body for the anode is prepared by further consolidation of the plate by use of a CIP (compaction pressure: 100 MPa).

Next, a slurry for the central portion is prepared by mixing terpineol and a binder with a tetragonal crystal zirconia powder and a cubic crystal zirconia powder. As illustrated in Table 1, the first intensity ratio R1 of the tetragonal crystal zirconia powder to the cubic crystal zirconia powder in a Raman spectrum of the center of the solid electrolyte layer is adjusted for each sample by adjusting the addition amount of the tetragonal crystal zirconia powder.

Next, a green body for the central portion is formed by coating the slurry for the central portion using a screen printing method onto the center of the green body for the anode.

Next, a slurry for the outer peripheral portion is prepared by mixing terpineol and a binder with a cubic crystal zirconia powder. As illustrated in Table 1, the slurry for the outer peripheral portion in Examples 1 to 3, 5 and 7 does not include addition of tetragonal crystal zirconia powder, and the slurry for the outer peripheral portion in Examples 4 and 6 includes addition of tetragonal crystal zirconia powder in a smaller amount than the central portion slurry. A green body for the outer peripheral portion is formed by using a screen printing method to coat the outer peripheral slurry and thereby enclose the green body for the central portion that is formed on the green body for the anode. In this manner, the green body for the solid electrolyte layer is completed.

Next, the green bodies for the anode and the solid electrolyte layer are cofired (1400 degrees C., 2 hours) to thereby form a co-fired body for the anode and the solid electrolyte layer. The size of the anode and the solid electrolyte layer is the same as Sample No. 1. The size of the central portion is height 10 mm and breadth 10 mm.

Next, a slurry for the cathode is prepared by mixing terpineol and a binder with LSCF powder. The green body for the cathode is formed by coating the cathode slurry by use of a screen printing method onto the solid electrolyte layer. Thereafter, the green body for the cathode is fired (1100 degrees C., 1 hour) to form the cathode. The size of the cathode is the same as Sample No. 1.

Six fuel cells made in the above manner are prepared, and a stainless steel separator is bonded to the six respective fuel cells.

A stainless steel member that includes a nickel mesh and a plurality of protrusions is bonded to both principal surfaces respectively of the seven stainless steel plates to thereby prepare seven current collecting members.

Next, the seven current collecting members and the six fuel cells bonded to stainless steel separators are alternately stacked with reference to a stacking direction.

An integrated configuration is realized in a compressed state in the stacking direction by fixing a bolt into a through hole that passes through the separator and the separator.

Preparation of Samples No. 8 to No. 13

A fuel cell stack according to No. 8 to No. 13 is prepared as described below.

Firstly, a mixed powder is prepared by drying a slurry of a mixture of IPA and a compounding powder of a pore-forming agent (PMMA), 8YSZ powder and NiO powder in a nitrogen atmosphere.

Next, uniaxial pressing (compaction pressure 50 MPa) is applied to the mixed powder to form a plate, and a green body for the anode is prepared by further consolidation of the plate by use of a CIP (compaction pressure: 100 MPa).

Next, a slurry for the overlapping portion is prepared by mixing terpineol and a binder with a tetragonal crystal zirconia powder and a cubic crystal zirconia powder. As illustrated in Table 1, the third intensity ratio R3 of the tetragonal crystal zirconia powder to the cubic crystal zirconia powder in a Raman spectrum of the overlapping portion is adjusted for each sample by adjusting the addition amount of the tetragonal crystal zirconia powder.

Next, a green body for the overlapping portion is formed by coating the slurry for the overlapping portion using a screen printing method onto a position that corresponds to the plurality of protrusions (connection portions for the cathode) of the stainless steel member (cathode current collecting member) as described below on the green body for the anode.

Next, a slurry for the non-overlapping portion is prepared by mixing terpineol and a binder with a cubic crystal zirconia powder. As illustrated in Table 1, the slurry for the non-overlapping portion in Examples 8 to 10, 12 and 13 does not include addition of tetragonal crystal zirconia powder, and the slurry for the non-overlapping portion in Example 11 includes addition of tetragonal crystal zirconia powder in a smaller amount than the overlapping portion slurry.

Next, the green body for the non-overlapping portion is formed by coating the non-overlapping portion slurry using a screen printing method to avoid the green body for the overlapping portion that is formed on the green body for the anode. In this manner, the green body for the solid electrolyte layer is completed.

Next, the green bodies for the anode and the solid electrolyte layer are cofired (1400 degrees C., 2 hours) to thereby form a co-fired body for the anode and the solid electrolyte layer. The size of the anode and the solid electrolyte layer is the same as Sample No. 1. The size of the overlapping portion is height 10 mm and breadth 10 mm. In Samples No. 8 to No. 13, nine overlapping portions are arranged uniformly in the solid electrolyte layer.

Next, a slurry for the cathode is prepared by mixing terpineol and a binder with LSCF powder. The green body for the cathode is formed by coating the cathode slurry by use of a screen printing method onto the solid electrolyte layer. Thereafter, the green body for the cathode is fired (1100 degrees C., 1 hour) to form the cathode. The size of the cathode is the same as Sample No. 1.

Six fuel cells made in the above manner are prepared, and a stainless steel separator is bonded to the six respective fuel cells.

A stainless steel member that includes a nickel mesh and a plurality of protrusions is bonded to both principal surfaces respectively of the seven stainless steel plates to thereby prepare seven current collecting members.

Next, the seven current collecting members and the six fuel cells bonded to stainless steel separators are alternately stacked with reference to a stacking direction. At that time, the position of the stainless steel separators and the fuel cells is adjusted so that the protrusions of the stainless steel members and the overlapping portions overlap with reference to the stacking direction.

An integrated configuration is realized in a compressed state in the stacking direction by fixing a bolt into a through hole that passes through the separator and the separator.

Measurement of Intensity Ratio of Tetragonal Crystal Zirconia to Cubic Crystal Zirconia by Raman Spectroscopy A Raman spectrum is obtained at a predetermined position on a cross section parallel to the direction of thickness for the solid electrolyte layer in Samples No. 1 to No. 13.

In Sample No. 1, a Raman spectrum is obtained at the center, outer edge, overlapping portion and non-overlapping portion of the solid electrolyte layer. The Raman spectrum is acquired at five positions that equally divide the solid electrolyte layer in the direction of thickness by use of a LabRAM ARAMIS manufactured by Horiba Ltd. Then respective analysis of the five Raman spectra with a CLS method is used to calculate the ratio of the spectral intensity of the tetragonal crystal zirconia to the spectral intensity of the cubic crystal zirconia, and thereby obtain a value for the arithmetic mean. In this manner, the first intensity ratio R1 of the tetragonal crystal zirconia at the center, the second intensity ratio R2 of the tetragonal crystal zirconia at the outer edge, the third intensity ratio R3 of the tetragonal crystal zirconia in the overlapping portion, and the fourth intensity ratio R4 of the tetragonal crystal zirconia in the non-overlapping portion are acquired.

In Samples No. 2 to No. 7, the Raman spectrum is acquired at the center and outer edge of the solid electrolyte layer, and in the same manner as Sample No. 1, the first intensity ratio R1 of the tetragonal crystal zirconia at the center, and the second intensity ratio R2 of the tetragonal crystal zirconia at the outer edge are acquired.

In Samples No. 8 to No. 13, the Raman spectrum is acquired at the overlapping portion and non-overlapping portion of the solid electrolyte layer, and in the same manner as Sample No. 1, the third intensity ratio R3 of the tetragonal crystal zirconia in the overlapping portion, and the fourth intensity ratio R4 of the tetragonal crystal zirconia in the non-overlapping portion are acquired.

Heat Cycle Testing of Fuel Cell Stack

Heat cycle testing is performed in relation to Samples No. 1 to No. 13.

More specifically, firstly, after increasing the temperature over 90 minutes from ambient temperature to 750 degrees C., the temperature is maintained at 750 degrees C. in a state in which the anode side is supplied with 4% hydrogen gas (4% hydrogen gas relative to Ar gas) to thereby perform reduction processing. The initial output of the fuel cell stack is measured. Then, supply of 4% hydrogen gas is continued and a reducing atmosphere is maintained while the temperature is reduced to less than or equal to 100 degrees C. The step of temperature increase and the step of temperature decrease are taken to be one cycle, and the cycle is repeated 20 times.

Next, He gas is supplied under pressure to the anode side to confirm the presence or absence of leakage of He gas to the cathode side. Furthermore, microscopic observation is made of the cross section of the solid electrolyte layer to confirm the presence or absence of cracks in the solid electrolyte layer.

The results of the heat cycle testing above are summarized in Table 1. In Table 1, a sample in which the initial output is high (that is to say, the resistance of the solid electrolyte layer is small), and cracks are not produced is evaluated as good (⊚), a sample in which the initial output is relatively low (that is to say, the resistance of the solid electrolyte layer is relatively high), or a sample in which cracks of less than or equal to 5 micrometers that have a low effect on the durability and performance of the fuel cell are produced is evaluated as acceptable (○), and a sample in which cracks of greater than 5 micrometers are produced is evaluated as unacceptable (X).

TABLE 1

| | | Solid Electrolyte Layer | | | | | | |
|---|---|---|---|---|---|---|---|---|
| Sample No. | Cubic Crystal Zirconia | Tetragonal CrystalZirconia | Intensity Ratio R1 at Center | Intensity Ratio R2 at Outer Edge | Intensity Ratio R3 in Overlapping Portion | Intensity Ratio R4 in Non-Ovelapping Portion | Results of Heat Cycle Testing | Evaluation |
| 1 | 8YSZ | non | 0 | 0 | 0 | 0 | Cracking | X |
| 2 | 10YSZ | 3YSZ | 0.12 | 0 | — | — | Minute Cracking | ○ |
| 3 | 8YSZ | 3YSZ | 0.20 | 0 | — | — | No Cracking | ⊚ |
| 4 | 8YSZ | 3YSZ | 0.60 | 0.03 | — | — | No Cracking | ⊚ |
| 5 | 10YSZ | 3YSZ | 0.85 | 0 | — | — | No Cracking | ⊚ |
| 6 | 8YSZ | 3YSZ | 1.2 | 0.05 | — | — | No Cracking | ⊚ |
| 7 | 8YSZ | 3YSZ | 1.5 | 0 | — | — | No cracking but large resistance | ○ |
| 8 | 8YSZ | 3YSZ | — | — | 0.10 | 0 | Minute Cracking | ○ |
| 9 | 8YSZ | 3YSZ | — | — | 0.20 | 0 | No Cracking | ⊚ |
| 10 | 10YSZ | 3YSZ | — | — | 0.45 | 0 | No Cracking | ⊚ |
| 11 | 8YSZ | 3YSZ | — | — | 0.72 | 0.04 | No Cracking | ⊚ |
| 12 | 10YSZ | 3YSZ | — | — | 1.2 | 0 | No Cracking | ⊚ |
| 13 | 8YSZ | 3YSZ | — | — | 1.6 | 0 | No crackimg but large resistance | ○ |

As shown in Table 1, in comparison to Sample No. 1, Samples No. 2 to No. 7 in which the first intensity ratio R1 of the cubic crystal zirconia at the center of the solid electrolyte layer is configured to be larger than the second intensity ratio R2 of the cubic crystal zirconia at the outer edge inhibit cracking of the solid electrolyte layer. In the same manner, in comparison to Sample No. 1, Samples No. 8 to No. 13 in which the third intensity ratio R3 of the cubic crystal zirconia in the overlapping portion of the solid electrolyte layer is configured to be larger than the fourth intensity ratio R4 of the cubic crystal zirconia in the non-overlapping portion inhibit cracking in the solid electrolyte layer. This feature is due to strengthening the backbone structure in the central portion or the overlapping portion by strong connection of cubic zirconia particles by tetragonal zirconia particles that have a small particle diameter when compared to cubic crystal zirconia.

Since cracking of the solid electrolyte layer in Examples 4 and 6 is inhibited, even when R2 is greater than 0, it is confirmed that the effect is obtained as long as the relationship R1>R2 is satisfied. In the same manner, since cracking of the solid electrolyte layer is also inhibited in Example 11 even when R4 is greater than 0, it is confirmed that the effect is obtained as long as the relationship R3>R4 is satisfied.

As shown in Table 1, it can be seen that cracking of the solid electrolyte layer can be suppressed by configuring the first intensity ratio R1 of the cubic crystal zirconia at the center of the solid electrolyte layer to be greater than or equal to 0.2 and less than or equal to 1.2, and that resistance in the solid electrolyte layer can be reduced.

As shown in Table 1, it can be seen that cracking of the solid electrolyte layer can be suppressed by configuring the third intensity ratio R3 of the cubic crystal zirconia in the overlapping portion of the solid electrolyte layer to be greater than or equal to 0.2 and less than or equal to 1.2, and that resistance in the solid electrolyte layer can be reduced.

The invention claimed is:

1. A fuel cell comprising;
an anode,
a cathode, and
a single solid electrolyte layer disposed between the anode and the cathode,
the single solid electrolyte layer comprising a central portion disposed at a center of the single solid electrolyte layer in a planar direction and an outer edge portion disposed at an outer edge of the single solid electrolyte layer in the planar direction, the central portion comprising cubic crystal zirconia as a main component and further comprising tetragonal crystal zirconia, and the outer edge portion comprising cubic crystal zirconia as a main component, wherein
a first intensity ratio of tetragonal crystal zirconia to cubic crystal zirconia in a Raman spectrum at the central portion of the single solid electrolyte layer is greater than a second intensity ratio of tetragonal crystal zirconia to cubic crystal zirconia in a Raman spectrum at the outer edge portion of the single solid electrolyte layer.

2. The fuel cell according to claim 1, wherein
the first intensity ratio at the center of the single solid electrolyte layer is greater than or equal to 0.2 and less than or equal to 1.2.

3. A fuel cell connected to a current collecting member, the fuel cell comprising:
an anode,
a cathode, and
a single solid electrolyte layer disposed between the anode and the cathode, wherein
the anode, the single solid electrolyte layer and the cathode are stacked in order with reference to a stacking direction,
the anode or the cathode is connected to a connection portion of the current collecting member, the single solid electrolyte layer includes an overlapping portion that overlaps with the connection portion with reference to the stacking direction, and a non-overlapping portion that is separated from the connection portion with reference to the stacking direction, the overlapping portion comprising cubic crystal zirconia as a main component and further comprising tetragonal crystal zirconia, and the non-overlapping portion comprising cubic crystal zirconia as a main component, and
a third intensity ratio of tetragonal crystal zirconia to cubic crystal zirconia in a Raman spectrum in the overlapping portion is greater than a fourth intensity ratio of tetragonal crystal zirconia to cubic crystal zirconia in a Raman spectrum in the non-overlapping portion.

4. The fuel cell according to claim 3, wherein
the third intensity ratio in the overlapping portion is greater than or equal to 0.2 and less than or equal to 1.2.

5. The fuel cell according to claim 1, wherein
the central portion and the outer edge portion have a substantially same thickness in a thickness direction of the fuel cell.

6. The fuel cell according to claim 1, wherein
the central portion and the outer edge portion are formed integrally.

7. The fuel cell according to claim 3, wherein
the overlapping portion and the non-overlapping portion have a substantially same thickness in a thickness direction of the fuel cell.

8. The fuel cell according to claim 3, wherein
the overlapping portion and the non-overlapping portion are formed integrally.

\* \* \* \* \*